United States Patent
Stanavich

[11] Patent Number: 5,997,102
[45] Date of Patent: Dec. 7, 1999

[54] PINNED TWO PIECE VEHICLE WHEEL

[75] Inventor: John R. Stanavich, Chelsea, Mich.

[73] Assignee: Hayes Lemmerz International, Inc., Romulus, Mich.

[21] Appl. No.: 09/087,368

[22] Filed: May 29, 1998

Related U.S. Application Data

[60] Provisional application No. 60/048,114, May 30, 1997.

[51] Int. Cl.⁶ .................................................. B60B 3/04
[52] U.S. Cl. ........................ 301/63.1; 301/65; 29/894.322
[58] Field of Search ..................... 301/10.1, 11.1, 301/11.2, 63.1, 64.2, 64.3, 64.4, 65, 95, 96, 97, 98; 29/894.321, 894.322

[56] References Cited

U.S. PATENT DOCUMENTS

| | | | |
|---|---|---|---|
| 2,439,881 | 4/1948 | Ash | 301/65 |
| 2,948,568 | 9/1960 | Hykes et al. | 301/63.1 |
| 3,235,312 | 2/1966 | Hollander | 301/63.1 |
| 3,346,301 | 10/1967 | Hurst, Jr. et al. | 301/65 |
| 3,506,311 | 4/1970 | Nobach . | |
| 3,549,205 | 12/1970 | Reid | 301/65 |
| 3,897,113 | 7/1975 | Walther et al. . | |
| 5,018,795 | 5/1991 | Engerand et al. . | |
| 5,257,455 | 11/1993 | Iwatsuki . | |

FOREIGN PATENT DOCUMENTS

| | | | |
|---|---|---|---|
| 3902362 | 8/1990 | Germany | 301/65 |
| 0247201 | 10/1989 | Japan | 301/65 |
| 4334601 | 11/1992 | Japan | 301/63.1 |

*Primary Examiner*—Russell D. Stormer
*Attorney, Agent, or Firm*—MacMillan, Sobanski & Todd, LLC

[57] ABSTRACT

A two piece wheel having a partial wheel rim mechanically attached to a full face wheel disc by at least one locking pin. The locking pin extends through an aperture formed in a collar extending from an inboard surface of the wheel disc and a corresponding aperture formed through the wheel rim end and is secured by a weld. A resilient material is disposed between the wheel disc and rim end to form an air-tight seal therebetween.

21 Claims, 6 Drawing Sheets

PINNED TWO PIECE VEHICLE WHEEL

CROSS REFERENCE TO RELATED APPLICATIONS

This application claims the benefit of U.S. Provisional Application No. 60/048,114, filed on May 30, 1997.

BACKGROUND OF THE INVENTION

This invention relates in general to vehicle wheels and in particular to a two piece vehicle wheel having a partial wheel rim mechanically pinned to a fill face wheel disc and a process for fabricating such a wheel.

It is known in the art to fabricate a vehicle wheel by attaching a wheel rim to a separately formed wheel disc. Typically, the wheel rim is rolled from steel strip stock and the disc is stamped from steel sheet stock. The rim is welded to the disc to form the wheel. Such a wheel is shown in U.S. Pat. No. 5,257,455 to Iwatsuki. Alternately, the wheel rim can be rolled from steel and the wheel disc cast or forged from a light weight metal, such as aluminum, titanium or magnesium, or an alloy of a light weight metal. Because the metals forming the rim and disc are different, a ferrous weld anchor is usually attached to the wheel disc. The wheel rim is welded to the weld anchor to assure that a good weld is formed between the rim and the disc. Such a wheel is described in U.S. Pat. No. 3,506,311 to Nobach and is commonly referred to a bimetal wheel. A bimetal wheel combines the economy, flexibility and strength of a steel rim with the pleasing ornamental appearance of three dimensional contours formed in a cast or forged wheel disc. It also is known to form the wheel rim from an alloy of a light weight metal, in which case it might be possible to eliminate the weld anchor.

To enhance the appearance of a two piece wheel, it is known to attach a wheel disc which includes the outboard tire retaining flange to a partial wheel rim. Such a wheel is commonly referred to as a full face wheel. When a tire is mounted upon a full face wheel, the joint between the wheel disc and wheel rim is completely hidden and only the wheel disc is visible. A decorative finish is often applied to the face of the wheel disc to further enhance the appearance of the wheel. Examples of typical decorative finishes include metal plating, such as chromium plating, clear coatings and paint.

Referring now to the drawings, there is shown in FIG. 1, a fragmentary sectional view of a typical prior art bimetal full face wheel 10. The wheel 10 is described in the Nobach patent listed above and includes a full face wheel disc 11 formed from a light weight metal or light weight metal alloy by a conventional process, such as gravity or low pressure casting, or forging. The full face wheel disc 1 includes a central wheel hub (not shown) which is supported by a plurality of wheel spokes (one shown) within an annular sidewall 12. An outboard tire bead retaining flange 13 extends in an outward radial direction from the sidewall 12.

A ring-shaped weld anchor 15 formed from a ferrous material, such as steel, is partially embedded in the wheel disc sidewall 12. An exposed portion of the weld anchor 15 forms a welding surface 16. An alternate structure for the weld anchor is disclosed in U.S. Pat. No. 5,421,642 to Archibald where the weld anchor includes an annular collar which is received by the outboard end of a partial wheel rim. The weld anchor collar positions the wheel rim on the wheel disc. The wheel disc 11 shown in FIG. 1 further includes a cylindrical collar 17 which extends axially from the inboard side of the sidewall 12. The collar 17 also extends radially over a portion of the weld anchor 15 to secure the weld anchor 15 to the wheel disc 11.

A conventional partial wheel rim 20 is attached to the inboard side of the wheel disc 11. The wheel rim 20 is typically formed from steel strip stock with conventional rim roll forming machinery. The wheel rim 20 includes a cylindrically-shaped outboard end 22. The outboard wheel rim end 22 includes an outboard tire bead seat 23 and outboard safety bead 24. The outboard rim end 22 extends over the wheel disc collar 17 and into contact with the welding surface 16 of the weld anchor 15. Typically, the outboard rim end 22 and the wheel disc collar 17 are sized to form a clearance fit therebetween, allowing the wheel rim 20 to be rotated relative to the wheel disc 11.

A continuous circumferential air-tight weld 25 is formed between the wheel rim 20 and the weld anchor 15. Typically, a conventional friction or inertial welding process is used to form the weld 25. During the welding process, the wheel disc 11 is held stationary while the wheel rim 20 is rotated with the outboard rim end 22 pressed against the weld anchor 15. The friction between the rim end 22 and the weld anchor 15 generates sufficient heat to partially melt the outboard wheel rim end 22 and the adjacent portion of the weld anchor 15 to form the weld 25. Alternately, the wheel disc and rim assembly can be rotated while one or more welding torches form the weld 25.

Referring now to FIG. 2, there is shown a flow chart for a known manufacturing process for fabricating the full face wheel 10 illustrated in FIG. 1. In functional block 30 a full face wheel disc is formed by a conventional process, such as casting or forging. A weld anchor is embedded in the wheel disc during the casting or forging process. Alternately, a weld anchor can be secured to an inboard surface of the wheel disc after the wheel disc has been formed. The wheel disc is heat treated in functional block 31 and then machined to final shape in functional block 32.

While the wheel disc is being formed, a flat strip of metal is rolled into a circular hoop and the ends butt welded together in functional block 35. The hoop is shaped into a partial wheel rim in functional block 36 by a conventional process, such as rolling or spinning.

In functional block 37, the partial wheel rim is attached to the wheel disc formed in functional blocks 30 through 32 by a conventional welding process. The weld extends circumferentially around the wheel and forms an air-tight seal between the wheel rim and wheel disc. Typically, it is difficult to weld the hoop concentrically upon the disc. If the outboard and inboard tire bead seats of the assembled wheel are outside the required tolerance limits for concentricity, undesirable vibrations may occur when the wheel is mounted upon a vehicle and the vehicle operated. Accordingly, the tire bead seats of the assembled wheel are machined in functional block 38 to assure that the required amount of concentricity is achieved.

SUMMARY OF THE INVENTION

This invention relates to a two piece vehicle wheel having a partial wheel rim mechanically pinned to a full face wheel disc and a process for fabricating such a wheel.

As described above, a two vehicle piece vehicle wheel frequently includes a partial wheel rim formed from steel or an alloy of a light weight metal, such as aluminum, magnesium or titanium, welded to a full face wheel disc which is cast or forged from an alloy of a light weight metal. A continuous 360 degree weld is required to assure an air-tight seal between the wheel rim and the wheel disc to avoid leakage of air from a tubeless pneumatic tire mounted upon the wheel. It would be desirable to mechanically attach the wheel rim to the wheel disc and thereby eliminate the weld.

Additionally, for a bimetal wheel, with the wheel rim and disc formed from different metals. a weld anchor is usually embedded in the wheel disc to assure formation of a good weld. It also would be desirable to assemble a bimetal wheel without a weld anchor.

The present invention contemplates a two piece vehicle wheel which includes a partial wheel rim having an outboard cylindrical end. The cylindrical end has at least one radially extending aperture formed therethrough. The wheel further includes a full face wheel disc having an annular collar extending axially from an inboard side thereof. The collar has a circumferential channel formed in an inboard surface with the channel extending in an axial direction toward the outboard end of the wheel disc. The collar also has at least one radially extending aperture formed therethrough. The cylindrical wheel rim end is received within the collar channel with the collar aperture aligned with the wheel rim aperture.

A pin extends through the collar aperture and into the wheel rim arpeture to mechanically secure the wheel rim end in the wheel disc collar channel. In the preferred embodiment, the pin is welded to the wheel assembly. A resilient material is disposed within the collar channel to form a continuous circumferential air-tight seal between the wheel rim end and the wheel disc.

Alternately, the invention also can be practiced with a wheel disc having an annular stepped collar extending axially from an inboard side thereof. The collar would include a reduced diameter end portion and at least one radially extending aperture formed through the reduced diameter end portion. The cylindrical wheel rim end extends over the reduced diameter collar end portion with the collar aperture aligned with the wheel rim aperture.

The invention further contemplates that the wheel rim end can have a plurality of radially extending apertures formed therethrough while the wheel disc collar can have a corresponding plurality of complementary radially extending apertures formed therethrough. A plurality of pins mechanically secure the wheel rim to the wheel disc with a pin extending through each of the complementary pairs of apertures.

The invention also contemplates a process for fabricating a two piece wheel which includes forming a full face wheel disc having an annular collar extending axially from an inboard side thereof. The collar includes an inner annular wall and an outer annular wall which cooperate with one another to define a cylindrical channel. The collar also has at least one radially directed aperture formed through at least one of the inner and outer walls. A resilient sealing material is applied circumferentially about the channel. A partial wheel rim is formed which includes a cylindrical outboard end having at least one radially directed aperture formed therethrough which corresponds to the aperture formed through the wheel disc collar. Then the outboard end of the wheel rim is inserted into the wheel disc channel with the wheel rim aperture aligned with the wheel rim aperture to form a wheel assembly. Next, a locking pin is inserted through the wheel rim aperture and the wheel disc aperture and secured to the wheel assembly. In the preferred embodiment, the locking pin is secured with a weld.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
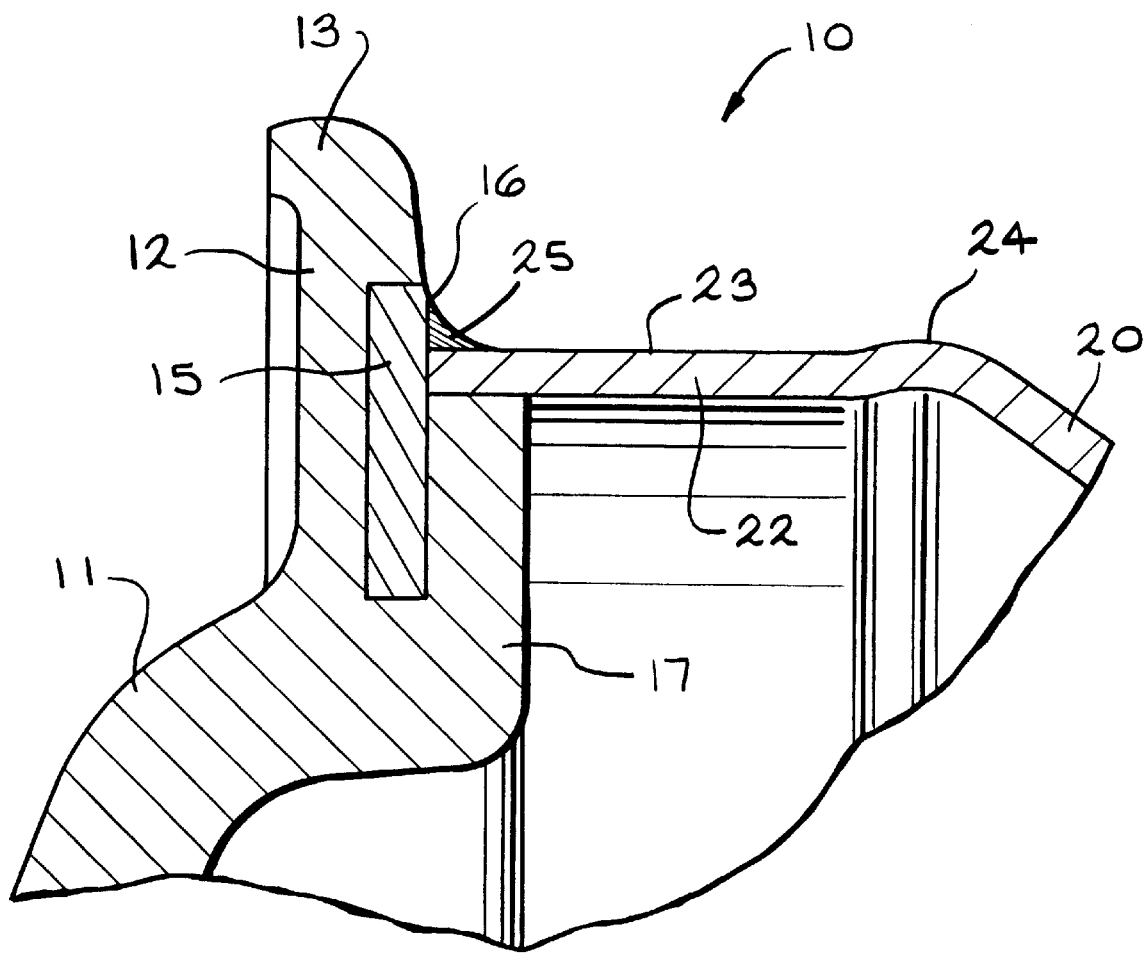
FIG. 1 is a fragmentary sectional view of a two piece vehicle wheel.
Figure 2:
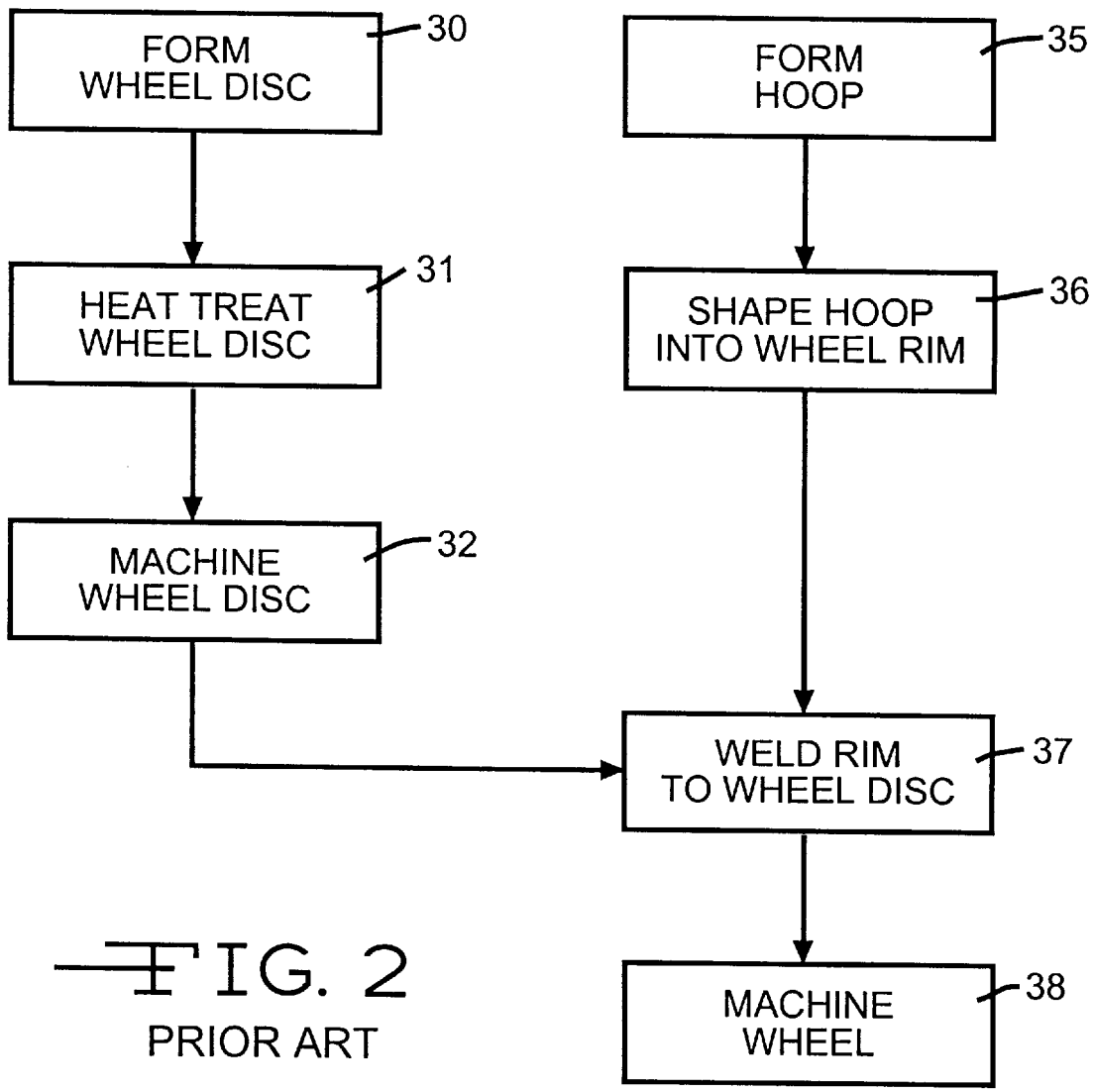
FIG. 2 is a flow chart for a known process for fabricating the two piece vehicle wheel shown in FIG. 1.
Figure 3:
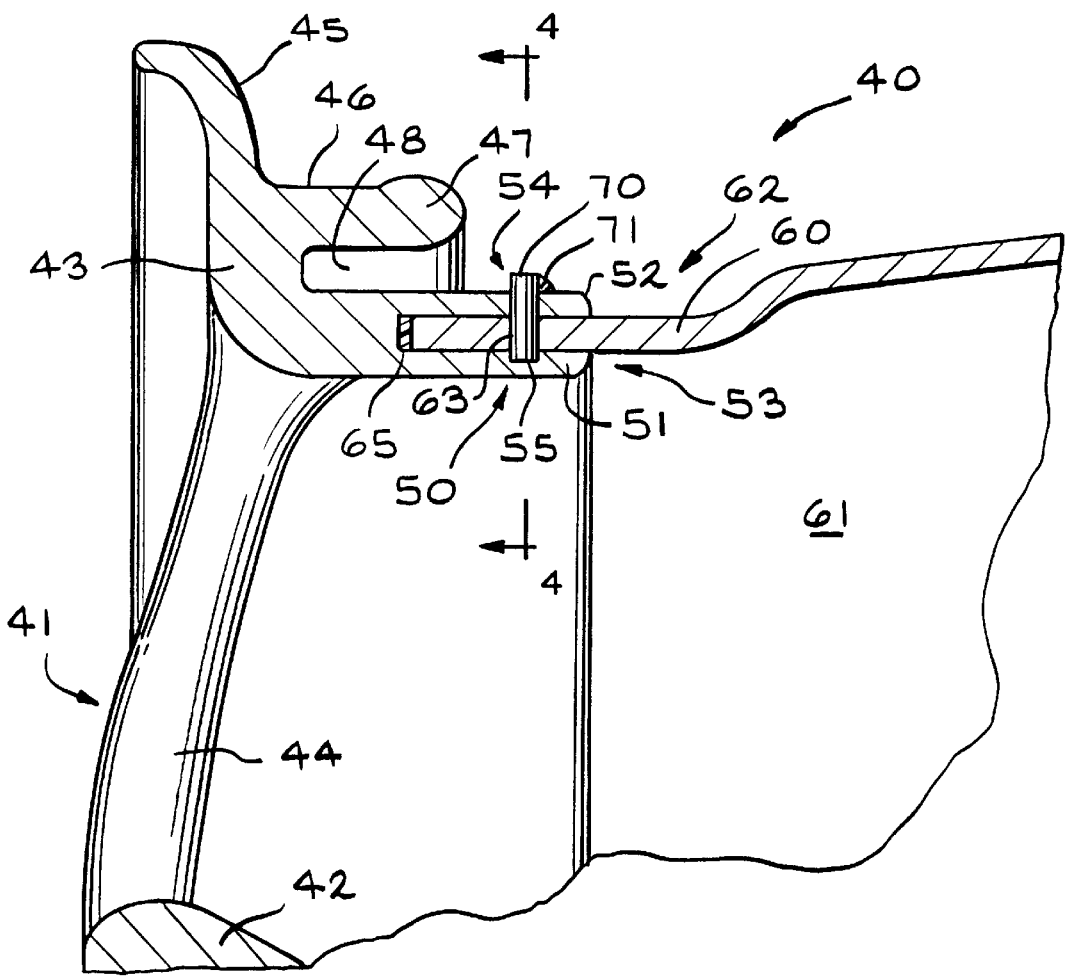
FIG. 3 is a fragmentary sectional view of a two piece wheel in accordance with the invention.

Referring again to the drawings, there is illustrated in FIG. 3, a two piece wheel, shown generally at 40, formed in accordance with the invention. In the preferred embodiment, the wheel 40 includes a full face wheel disc 41 formed from an alloy of a light weight metal, such as aluminum, magnesium or titanium, by a conventional process, such as casting or forging. It will be appreciated; however, that the wheel disc also can be formed from a steel alloy. The wheel disc 41 includes a central wheel hub 42 supported within an annular sidewall 43 by a plurality of spokes 44 (one shown). An outboard tire bead retaining flange 45 extends in an outward radial direction from the sidewall 43. An outboard tire bead seat 46 extends axially from the retaining flange 45 and terminates in an outboard safety bead 47. A lightener pocket 48 extends in an axial direction beneath the tire bead seat 46; however, the lightener pocket 48 is optional.

A collar 50 extends axially toward the inboard end of the wheel 40 from the inboard face of the wheel disc 41. The collar 50 includes an annular inner wall 51 and an annular outer wall 52, which is spaced apart in a radial direction from the inner wall 51. The inner and outer walls 51 and 52 cooperate with one another to define an annular channel 53 which extends axially toward the outboard end of the wheel disc 41. In the preferred embodiment, the channel 53 extends circumferentially through 360 degrees. A plurality of radially extending outer apertures 54 (one shown) extend through the outer wall 52. A corresponding plurality of cylindrical inner recess 55 are formed in the inner wall 51. Each of the recesses 55 is radially aligned across the channel 53 from a corresponding outer aperture 54. The outer apertures 54 and inner recesses 55 are spaced uniformly around the circumference of the collar 50.

Figure 4:
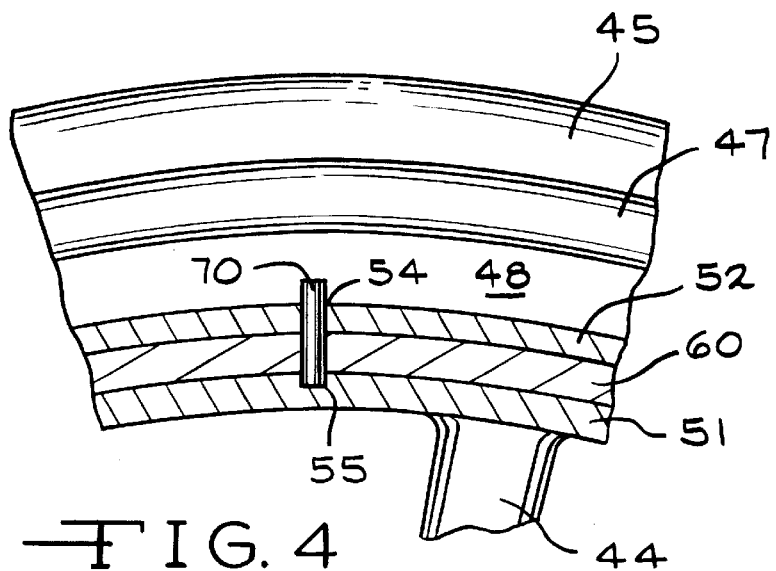
FIG. 4 is a fragmentary sectional view taken along line 4—4 in FIG. 3.

A cylindrical outboard end 60 of a partial wheel rim 61 is received in the wheel disc channel 53. The wheel rim 61 is formed by a conventional process, such as rolling or spinning, from a strip of a light weight metal alloy or an alloy of steel. In the preferred embodiment, the wheel rim end 60 forms a press fit with the channel 53. Alternately, a sliding fit can be formed therebetween. As shown in FIG. 3, the wheel rim end 60 forms a portion of a deep well 62 for the wheel 40. A plurality of apertures 63 (one shown), which correspond to the outer apertures 54 and inner recesses 55 formed in the wheel disc collar 50, extend radially through the end 60 of the wheel rim 61. As shown in FIGS. 3 and 4, upon assembly of the wheel rim 61 with the wheel disc 41, the apertures 63 in the wheel rim 61 are radially aligned with the outer apertures and inner recesses 54 and 55 formed in the annular walls 52 and 51, respectively, of the wheel disc collar 50.

A resilient sealing material 65, such as an elastic silicone polymer, is disposed along the outboard end of the channel 53 and extends continuously thereabout. The sealing material 65 forms an air-tight seal between the wheel rim 61 and the wheel disc 41. If the press fit described above is sufficient to form a circumferential air-tight seal between the wheel rim end 60 and the wheel disc collar 50, the resilient material 65 can be omitted. Accordingly, the resilient material 65 shown in FIG. 4 is optionally included.

A plurality of locking pins 70 (one shown) extend through each of the apertures 54 formed in the outer annular wall 52 of the wheel disc collar 50 and the corresponding aperture 63 formed through the wheel rim end 60. Each pin 70 is seated in the associated recess 55 formed in the inner wall of the collar 50. In the preferred embodiment, the locking pins 70 are press fit into the apertures 54 and 63 and the recess 55. The locking pins 70 mechanically secure the wheel rim 61 to the wheel disc 41 while preventing any axial or radial movement therebetween. Also, in the preferred embodiment, each pin 70 is secured by a spot weld 71 to the outer wall 52 of the wheel disc collar 50. While the locking pins 70 are welded to the wheel disc collar 50 in the preferred embodiment, it will be appreciated that other methods can be used to secure the locking pins 70, such as, for example an adhesive.

Figure 5:
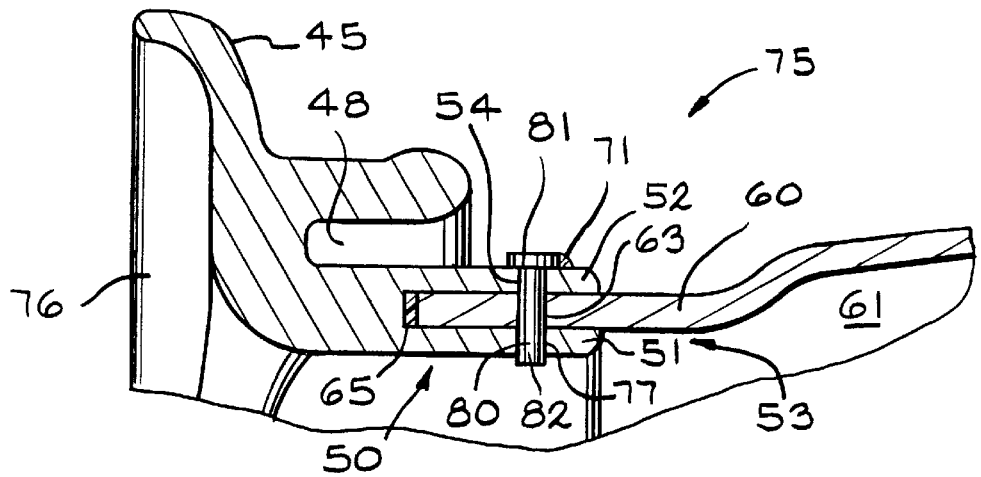
FIG. 5 is a fragmentary sectional view of an alternate embodiment of the two piece wheel shown in FIG. 3.

An alternate embodiment of the invention is illustrated with the wheel 75 shown in FIG. 5. Components of the wheel 75 which are the same as components of the wheel 40 shown in FIGS. 3 and 4 have the same numerical designators. The wheel 75 includes a partial wheel rim 61 which is mechanically attached to an inboard surface of a full face wheel disc 76. Similar to the wheel 40 described above, the wheel disc 76 includes a collar 50 extending from an inboard face. The collar 50 has an inner wall 51 and an outer wall 52 which cooperate to define a channel 53. However, an inner aperture 77 is formed completely through the inner wall 51 in lieu of the recess 55 described above.

A locking pin 80 which includes a disc shaped head 81 and a cylindrical shank 82 mechanically secures the end 60 of the wheel rim 61 in the channel 53.

The locking pin shank 82 extends through the outer aperture 54, the corresponding wheel rim aperture 63 and the inner aperture 77. The locking pin head 81 limits the radial displacement of the locking pin 80 within the apertures.

A spot weld 71 secures each locking pin 80 to the outer wall 52 of the wheel disc collar 50. It is also contemplated that a spot weld can be formed between the end of the shank 82 and the inner wall 51 of the collar 50 (not shown).

Figure 6:
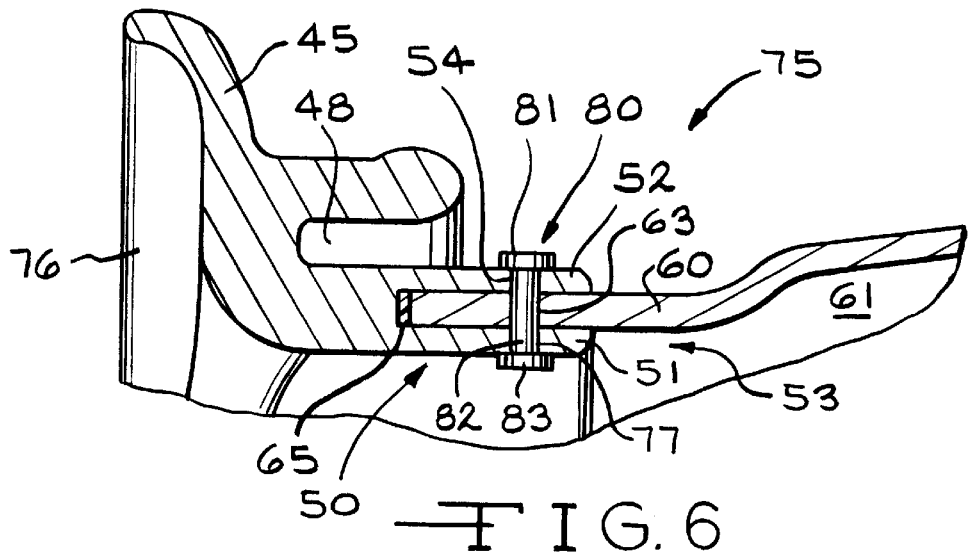
FIG. 6 is a fragmentary sectional view of an alternate embodiment of the two piece wheel shown in FIG. 5.

An alternate embodiment of the wheel 75 is illustrated in FIG. 6, where, instead of welding, the bottom end of the locking pin shank 82 is be peened or flattened to form a second head 83 to secure the wheel disc 76 to the end of the wheel rim 61. Additionally, the pin shank 82 can be heated to facilitate the forming of the second head 83. Upon cooling, the shank 82 contracts and pulls the inner and outer annular walls 51 and 52 against the wheel rim end 60. If a sufficient number of pins 80 are used in the wheel structure shown in FIG. 6, a circumferential air-tight seal can be formed between the wheel disc collar 50 and the wheel rim end 60 without the resilient material 65. Accordingly, the resilient material 65 shown in FIG. 6 is optionally included.

Figure 7:
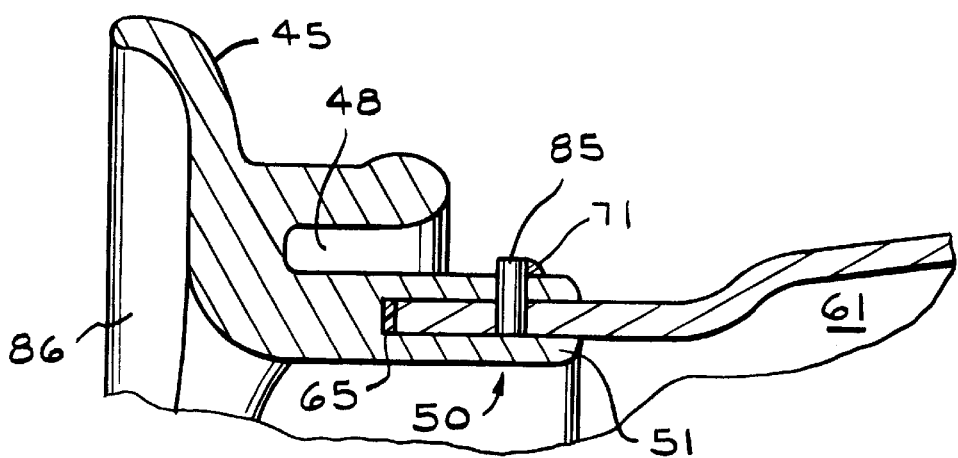
FIG. 7 is a fragmentary sectional view of another alternate embodiment of the two piece wheel shown in FIG. 3.

Another embodiment of the invention, which is shown in FIG. 7, includes a locking pin 85 extending through the outer aperture 54 and the corresponding wheel rim aperture 63 as shown in the preceding figures. However, the lower end of the locking pin 85 abuts the surface of the inner annular wall 51 of the wheel disc collar 50. As shown in FIG. 7, there is no recess or aperture formed in the inner wall 51 of the collar 50.

Figure 8:
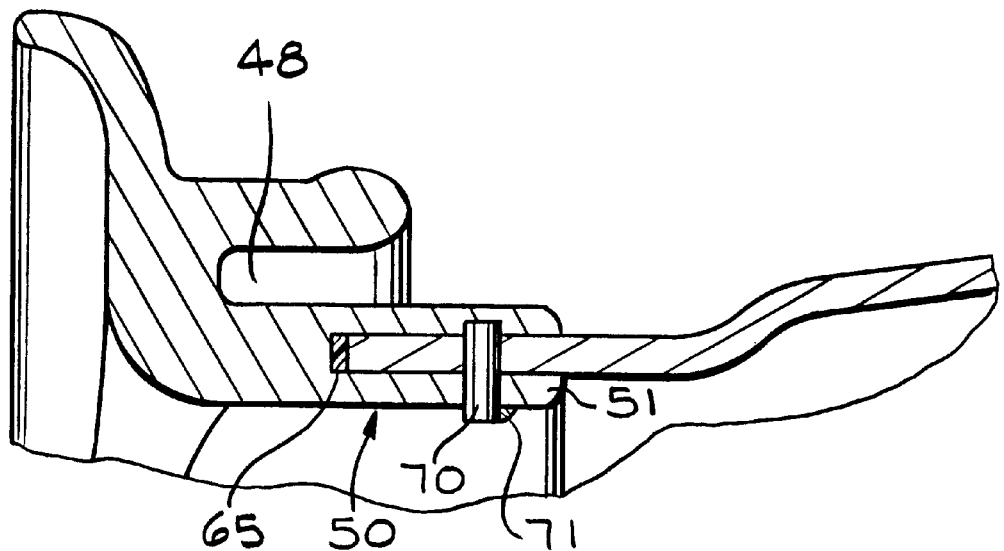
FIG. 8 is a fragmentary sectional view of another alternate embodiment of the two piece wheel shown in FIG. 3.

In FIG. 8, another embodiment of the invention is illustrated in which the locking pin 70 extends in an outward radial direction from within the wheel. The weld 71 securing the locking pin 70 is formed between the locking pin 70 and the inner annular wall 51 of the wheel disc collar 50.

Figure 9:
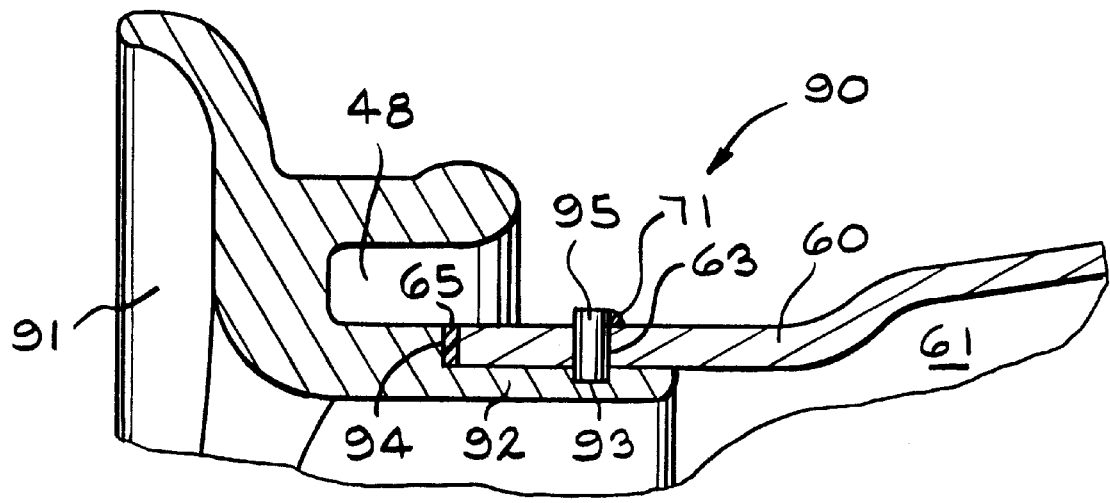
FIG. 9 is a fragmentary sectional view of another alternate embodiment of the two piece wheel shown in FIG. 3.

Yet another embodiment of the invention is illustrated by the wheel 90 shown in FIG. 9. As before, components of the wheel 90 which are the same as components of the wheel 40 are identified by the same numerical designators. The wheel 90 includes a wheel disc 91 having a radially stepped cylindrical collar 92 extending axially from an inboard face. The inboard end portion of the collar 92 has an outside diameter which is less than the inside diameter of the outboard end 60 of the partial wheel rim 61. A plurality of cylindrical recesses 93, which correspond to the apertures 63 formed though the end 60 of the wheel rim 61, are formed in the outer surface of the collar 92. The radial step in the collar 92 defines a shoulder 94.

The outboard end 60 of the wheel rim 61 extends over the wheel disc collar 92. Locking pins 95 extend through the apertures 63 formed in the rim end 60 and are seated in the collar recesses 93. Each locking pin 95 is secured to the wheel rim end 60 by a spot weld 71. Resilient material 65 is disposed between the wheel disc shoulder 94 and the wheel rim end 60 to form a circumferential air-tight seal between the wheel disc 91 and the wheel rim 61.

While the preferred embodiment has been shown in FIG. 9, it will be appreciated that the invention can be practiced other than shown. For example, the stepped end of the collar could be formed oil the inside surface thereof with the wheel rim end received within the collar (not shown). Also, the resilient material could be disposed between the inside surface of the wheel rim end and the outside surface of the wheel disc collar (not shown). Additionally, the structures for the locking pin illustrated in FIGS. 5 and 6 can be applied to the wheel 90 shown in FIG. 9.

Figure 10:
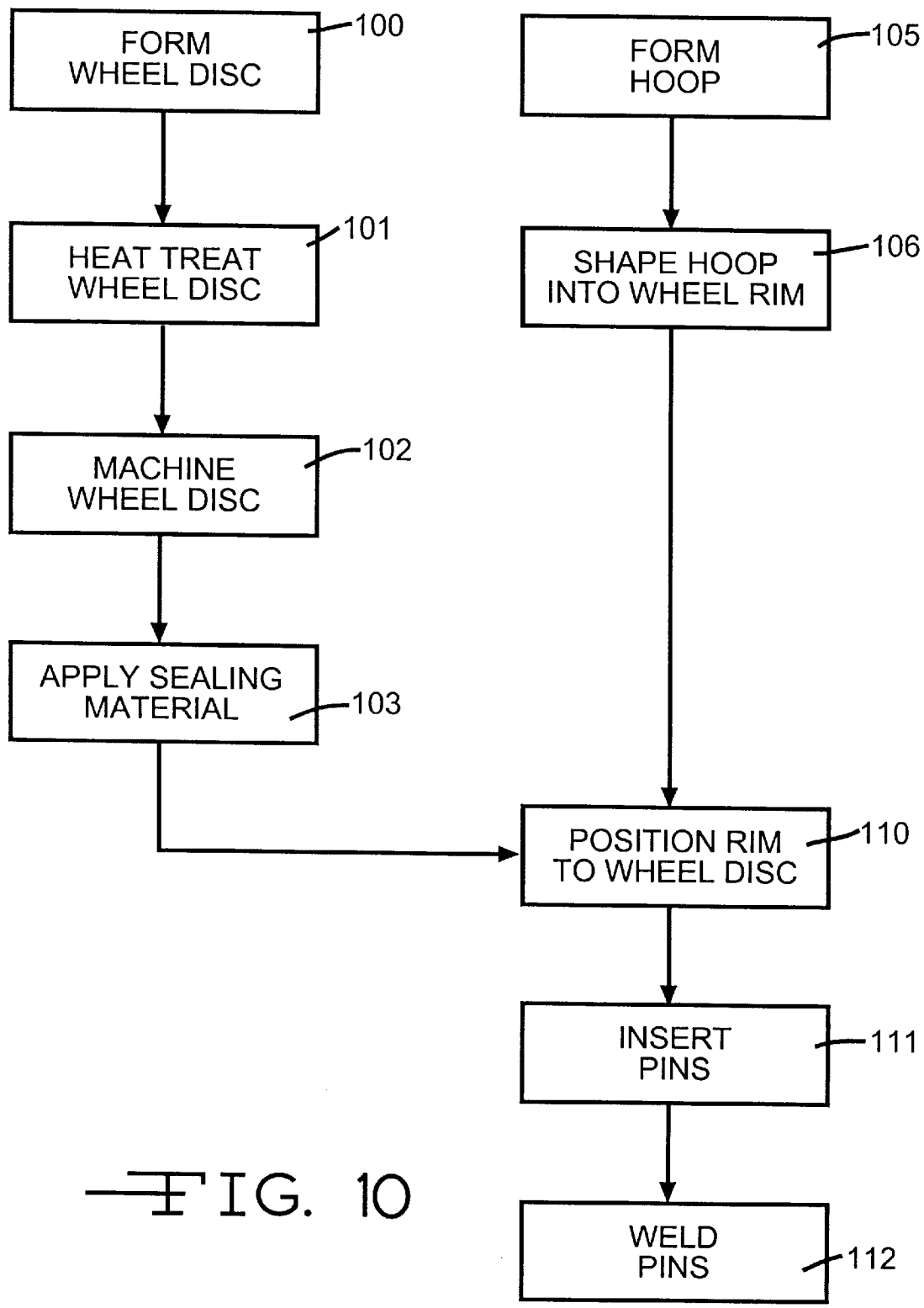
FIG. 10 is a flow chart for a process for fabricating the wheel shown in FIG. 3.

The present invention also contemplates a process for forming the wheels shown in FIGS. 3 through 9. The process is illustrated by the flow chart shown in FIG. 10. Referring now to FIG. 10, in functional block 100, a wheel disc is formed by a conventional process, such as casting or forging. The wheel disc includes a collar extending axially from an inboard face. An annular channel is formed in the inboard end of the collar.

The wheel disc is heat treated in functional block 101. In functional block 102, the wheel disc is machined to final shape. During the machining, the apertures and recesses for the locking pins are drilled into the collar walls.

Resilient scaling material is disposed within the wheel disc channel in functional block 103. However, as explained above, the sealing material is optional. The sealing material extends continuously about the groove.

Concurrently with forming the wheel disc, a wheel rim is formed. In functional block 105 a strip of metal is rolled into a circular hoop and the ends of the strip are butt welded together. The hoop is formed into a partial wheel rim in functional block 106 by a conventional process, such as rolling or spinning. Included in this step is drilling the locking pin apertures through the outboard end of the wheel rim.

The wheel rim is positioned on the wheel disc in functional block 110 by inserting the outboard end of the wheel rim into the wheel disc channel with the wheel rim apertures aligned with the corresponding wheel disc apertures. In the preferred embodiment, the end of the wheel rim is pressed into the wheel disc groove. The outboard end of the wheel rim co-operates with the resilient material in the channel to form a continuous circumferential air-tight seal between the wheel disc and the wheel rim.

The locking pins arc inserted into the apertures and recesses in functional block 111. In the preferred embodiment, the locking pins are pressed into the apertures and recesses The locking pins are secured with spot welds in functional block 112. Alternately, the locking pins can be secured with an adhesive.

The wheel structure of the present invention has a number of advantages over prior art two piece wheels. The present invents eliminates the need to include a weld anchor in a bimetal wheel. Additionally, the 360 degree circumferential weld used to join the wheel disc to the wheel rim in prior art wheels is eliminated. Similarly, the air-tight requirement for the wheel welds is also eliminated. Furthermore, the locking pins control the lateral run-out of the wheel.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, it will be appreciated that the invention also can be practiced upon a two piece vehicle wheel having the rim and disc formed form the same metal. Alternately, the wheel disc and rim can be formed from a nonmetal material, such as a plastic. Additionally, the resilient sealing material can be applied continuously along a surface of one of the walls of the wheel disc groove.

What is claimed is:

1. A two piece vehicle wheel comprising:
   a partial wheel rim having an outboard cylindrical end, said end having at least one radially extending aperture formed therethrough;
   a full face wheel disc having an annular collar extending axially from an inboard surface thereof, said collar having an inboard surface, said collar having a circumferential channel formed in said inboard collar surface, said channel extending in an axial direction toward the outboard end of said wheel disc, said collar having at least one radially extending aperture formed therethrough, said channel receiving said cylindrical wheel rim end with said collar aperture aligned with said wheel rim aperture; and
   a pin extending through said collar arpeture and into said wheel rim arpeture to mechanically secure said wheel rim end in said wheel disc collar channel.

2. A vehicle wheel according to claim 1 further including a resilient material disposed within said collar channel, said resilient material forming a continuous circumferential air-tight seal between said wheel rim end and said wheel disc.

3. A vehicle wheel according to claim 2 wherein said wheel rim has a plurality of radially extending apertures formed therethrough and said wheel disc collar has a corresponding plurality of complementary radially extending apertures formed therethrough, and further wherein a pin extends through each complementary pair of apertures.

4. A vehicle wheel according to claim 1 wherein said pin is secured to said collar.

5. A vehicle wheel according to claim 4 wherein said pin is welded to said collar.

6. A vehicle wheel according to claim 4 wherein said pin is adhesively secured to said collar.

7. A vehicle wheel according to claim 4 wherein said wheel disc collar includes a first annular wall extending axially from an inboard surface thereof and a second annular wall which is in a radially outward direction from said first annular wall, said first annular wall co-operating with said second annular wall to define said channel, and further wherein said collar arpeture is formed through said outer annular wall.

8. A vehicle wheel according to claim 4 wherein said wheel disc collar includes a first annular wall extending axially from an inboard surface thereof and a second annular wall which is in a radially outward direction from said first annular wall, said first annular wall co-operating with said second annular wall to define said channel, and further wherein said collar arpeture is formed through said inner annular wall.

9. A vehicle wheel according to claim 4 wherein said wheel disc collar includes a first annular wall extending axially from an inboard surface thereof and a second annular wall which is in a radially outward direction from said first annular wall, said first annular wall co-operating with said second annular wall to define said channel, and further wherein said collar arpeture and said pin extend through both of said inner and outer annular walls.

10. A vehicle wheel according to claim 9 wherein both ends of said pin are flattened to form a rivet which secures said wheel rim to said wheel disc.

11. A vehicle wheel according to claim 5 wherein said wheel rim is formed from an alloy of a first metal and said wheel disc is formed from an alloy of a second metal, said second metal being different from said first metal.

12. A two piece vehicle wheel comprising:
   a partial wheel rim having an outboard cylindrical end, said end having at least one radially extending aperture formed therethrough;
   a full face wheel disc having an annular stepped collar extending axially from an inboard surface thereof, said collar including a reduced diameter end portion and at least one radially extending aperture formed through said reduced diameter end portion, said cylindrical wheel rim end extending over said reduced diameter collar end portion with said collar aperture aligned with said wheel rim aperture; and
   a pin extending through said collar arpeture and into said wheel rim arpeture to secure said wheel rim end in said wheel disc collar groove.

13. A vehicle wheel according to claim 12 further including a resilient material disposed within said collar groove, said resilient material forming a continuous circumferential air-tight seal between said wheel rim end and said wheel disc.

14. A process for fabricating a two piece wheel comprising the steps of:
   (a) forming a full face wheel disc having an annular collar extending axially from an inboard surface thereof, the collar including an inner and outer annular wall, the annular walls cooperating with one another to define a cylindrical channel, the collar further having at least one radially directed aperture formed through at least one of the inner and outer walls;
   (b) applying a resilient sealing material to the channel;
   (c) forming a partial wheel rim having a cylindrical outboard end, the outboard rim end having at least one radially directed aperture formed therethrough, the aperture corresponding to the aperture formed through the wheel disc collar;

(d) inserting the outboard end of the wheel rim into the wheel disc channel with the wheel rim aperture aligned with the wheel rim aperture to form a wheel assembly;

(e) inserting a locking pin through the wheel rim aperture and the wheel disc aperture; and (f) securing the locking pin to the wheel assembly.

15. The process according to claim 14 wherein in step (f) the locking pin is welded to the wheel assembly.

16. The process according to claim 14 wherein in step (f) the locking pin adhesively secured to the wheel assembly.

17. A process for fabricating a two piece wheel comprising the steps of:

(a) forming a full face wheel disc having an annular collar extending axially from an inboard surface thereof, the collar having a reduced diameter circumferential groove formed in the inboard end thereof, the collar further having at least one radially directed aperture formed through the base of the groove;

(b) applying a resilient sealing material to the groove;

(c) forming a partial wheel rim having a cylindrical outboard end, the outboard end having at least one radially directed aperture formed therethrough, the aperture corresponding to the aperture formed through the wheel disc collar;

(d) inserting the outboard end of the wheel rim into the wheel disc groove with the wheel rim aperture aligned with the wheel rim aperture to form a wheel assembly;

(e) inserting a locking pin through the wheel rim aperture and the wheel disc aperture; and (f) securing the locking pin to the wheel assembly.

18. The process according to claim 17 wherein in step (f) the locking pin is welded to the wheel assembly.

19. The process according to claim 17 wherein in step (f) the locking pin is adhesively secured to the wheel assembly.

20. The process according to claim 17 wherein in step (a) the groove is formed in the outer radial surface of the collar and further wherein in step (d) the rim end extends over the end of the wheel disc collar.

21. The process according to claim 17 wherein in step (a) the groove is formed in the inner radial surface of the collar and further wherein in step (d) the rim end extends into the end of the wheel disc collar.

* * * * *